United States Patent

[11] 3,588,626

[72] Inventor Alan G. Cooper
     North Adams, Mass.
[21] Appl. No. 814,950
[22] Filed Apr. 10, 1969
[45] Patented June 28, 1971
[73] Assignee Sprague Electric Company
     North Adams, Mass.

[54] LEADLESS SOLID ELECTROLYTE TANTALUM CAPACITOR
     5 Claims, 2 Drawing Figs.
[52] U.S. Cl. ................................. 317/230, 29/570
[51] Int. Cl. ................................. H01g 9/05
[50] Field of Search ................................. 317/230, 231, 232, 233; 29/570

[56] References Cited
     UNITED STATES PATENTS
     2,923,866  2/1960  Wagner ..................... 317/230
     3,054,029  9/1962  Wagner et al ............... 317/230
     3,243,316  3/1966  O'Nan et al ................ 317/230
     3,277,349  10/1966 Hyland et al ............... 317/230

Primary Examiner—James D. Kallam
Attorneys—Connolly and Hutz, Vincent H. Sweeney, James Paul O'Sullivan and David R. Thornton ABSTRACT: A solid electrolyte tantalum capacitor is provided wherein the wire connection to the tantalum sintered pellet is eliminated.

A nonporous tantalum pad is pressed or welded to the pellet body and, after anodization, a nonwetting, high-temperature resistance coating is applied over the oxide film covering the pad. The coating acts to mask the pad from subsequent semiconductor deposition. An anode connection can then be made either by exposing the surface of the tantalum pad or by welding through the masking and underlying oxide to the pad surface.

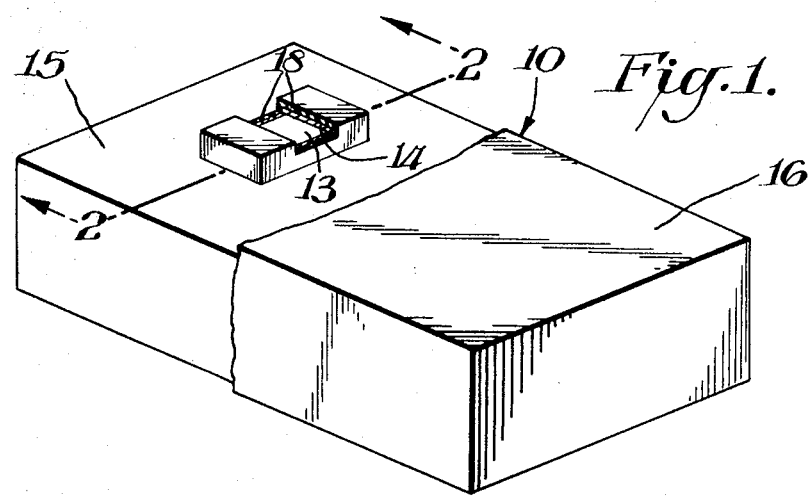
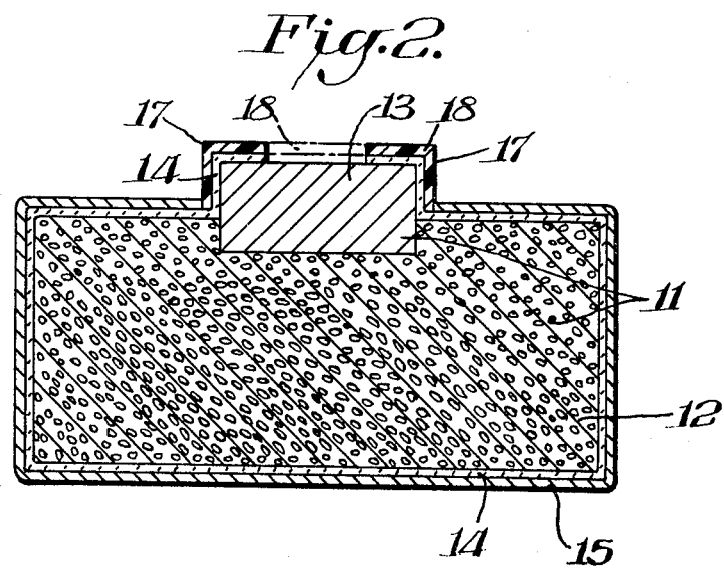

LEADLESS SOLID ELECTROLYTE TANTALUM CAPACITOR

BACKGROUND OF THE INVENTION

This invention relates to solid electrolyte tantalum capacitors and particularly to such a capacitor wherein the conventional riser wire connection to the anode is eliminated.

The above capacitors are finding increasing use in applications wherein extremely high frequency signals (over 0.5 mHz.) are encountered, i.e., digital computers. At these frequencies, the self-inductance of the capacitor creates an inductive reactance which limits capacitor operation at these frequencies. A significant portion of this inductance is created by the lead wires to the capacitor, primarily the anode lead-in wire or riser. This anode connection is especially troublesome since it requires that a tantalum riser be welded or pressed into the anode followed by the welding, to the riser, of the positive wire connection. Attempts to eliminate the riser connections heretofore been unsuccessful since the sintered body, after anodization and electrolyte deposition, will not support or "hold" a direct connection made through the formed oxide and electrolyte layers. Also, the close proximity of raw metal and semiconductor create a condition wherein shorts are likely to occur.

It is therefore the object of the present invention to provide a solid electrolyte capacitor whose inductive reactance at high frequencies is greatly reduced.

It is a further object to provide such a capacitor having a novel anode construction which permits direct connection of a positive lead to the anode after anodization and electrolyte deposition have been completed thereby eliminating the usual riser connection heretofore required.

SUMMARY OF THE INVENTION

Broadly, this invention concerns leadless tantalum capacitors and more particularly to the sintered anode pellet of a solid electrolyte tantalum capacitor which has provided on a portion thereof, a nonporous tantalum pad of appropriate thickness to which a direct lead connection can be made after processing steps are completed.

This pad is attached by welding or pressing and sintering, a tantalum pad of appropriate thickness to the powder pellet surface. The pad can take the form of a bar or a disc; it can be any desired size so long as a lead connection can be made to it and its location can be either on the end or lateral surface of the pellet. The pad can project above the surface of the pellet or can be designed to be flush with the surface. The pad surface is protected from subsequent electrolyte processing by a coating of a nonwetting agent capable of withstanding the associated high temperatures. Upon removal of this coating and the underlying oxide, the pad surface can be used as an anode termination by any desired means.

DESCRIPTION Description OF THE DRAWING

FIG. 1 is a perspective view of a solid electrolyte capacitor having a contact area according to the invention;

FIG. 2 is a cross-sectional view through line 2-2 of the capacitor of FIG. 1.

DETAILED DESCRIPTION OF THE INVENTION

Referring to FIG. 1, there is shown capacitor 10 having a composite anode 11 comprising anode pellet 12 and bar 13. An oxide coating 14 forms the dielectric layer of the capacitor. A coating 15 of suitable solid electrolyte such as manganese dioxide overlies dielectric layer 14. The cathode is provided by applying a silver coating 16 over electrolyte coating 15. Nonwetting, heat-resistant segments 17, (portions of coating 18 shown partially dotted) overlie the portions of dielectric layer 14 formed on bar 13.

The capacitor is formed in the following manner. Composite anode 11 is prepared by spot welding or pressing and sintering together tantalum bar 13 of a suitable thickness and tantalum pellet 12. A dielectric layer is then formed over the surface of the composite anode. A Teflon (i.e. polytetrafluoroethylene coating 18, approximately 0.003 in. thick, is painted over the portions of the dielectric layer formed on the bar surface and the capacitor processing is completed by deposition of a layer of manganese dioxide. The $MnO_2$ does not adhere to the Teflon coating; hence, layer 15 is only formed around pellet 12 as shown. A portion of the Teflon and dielectric on the bar surface is abraded away to expose the bar tantalum surface. This action results in the formation of segments 17 and leaves a remaining dielectric layer 14, a portion of which serves to insulate the manganese dioxide layer 15 from the exposed tantalum metal. Layer 16 is then applied over a portion of the electrolyte coating to serve as the cathode termination. While Teflon is used to form coating 18 in the preferred embodiment, any of the polymerized fluorocarbons may be used. The required properties of the material used are that it be nonwetting and that it be heat-resistant up to the temperature required during processing (up to 400° C).

The exposed surface of the tantalum bar is now available as an anode termination. For example, a silver coating can be applied over the exposed surface and the desired connection soldered in place. Alternatively, nickel or other conductive metals can be attached to the surface by parallel gap or indirect resistance welding. In the latter instance, it is possible to weld directly through the Teflon and oxide coating; hence, the abrading mentioned above is not required.

Although only one embodiment of the invention has been shown, other embodiments may obviously be provided. The bar may e located over other portions of the capacitor and may be larger or smaller than indicated. The capacitor section may be cylindrical rather than rectangular with an end-mounted tantalum disc. And while the preferred embodiment utilizes a tantalum anode, the invention should be understood as not being restricted thereto. The invention is to be understood to include other valve-forming metals such as aluminum, zirconium, and niobium and while the preferred electrolyte cited is manganese dioxide, any of the higher oxides of manganese, lead and nickel can be used as well as the organic semiconductors such as the quaternary ammonium complex salts.

I claim:

1. A solid electrolyte capacitor comprising an anode consisting of a porous valve-metal section and a nonporous valve-metal section integrally connected together forming a unitary anode singular anodic oxide; a dielectric layer formed over the surface of said porous and nonporous sections of said anode; a coating of a nonwetting, heat-resistant, electrically insulating material overlying the portion of said dielectric layer formed on said nonporous section; a solid electrolyte overlying the portion of the dielectric layer not covered by said electrically insulating coating; and a conductive cathode layer overlying at least a portion of said electrolyte.

2. The capacitor of claim 1 wherein said valve-metal sections are tantalum.

3. The capacitor of claim 1 wherein said nonwetting heat-resistant electrically insulating material is a polymerized fluorocarbon.

4. The capacitor of claim 1 wherein a portion of the electrically insulating coating and dielectric layer over the nonporous section are removed exposing the bare tantalum metal for forming a conductive anode terminal area of at least a portion of the exposed surface.

5. A method for forming a leadless solid electrolyte capacitor comprising the steps of:
joining a nonporous valve-metal member and a porous valve metal pellet to form the capacitor anode having a porous and nonporous section; anodizing the anode to form a singular dielectric layer over the surface of said sections; coating the portion of the dielectric layer overlying the surface of the nonporous section with a nonwetting, heat-resistant, electrically insulating material; depositing a solid electrolyte layer over the portion of the dielectric layer covering said porous section, applying a conductive cathode layer to at least a portion of the electrolyte layer, and forming an opening in said electrically insulating material and said dielectric layer over said nonporous section for exposing an anode terminal area in at least a portion of the surface of the nonporous section